US010824483B2

(12) United States Patent
Gino et al.

(10) Patent No.: US 10,824,483 B2
(45) Date of Patent: Nov. 3, 2020

(54) APPLICATION PROGRAMMING INTERFACE SCORING, RANKING AND SELECTION

(71) Applicant: R SOFTWARE INC, San Francisco, CA (US)

(72) Inventors: Iddo Gino, San Francisco, CA (US); Andrey Bukati, Ashqelon (IL); Srivatsan Srinivasan, San Francisco, CA (US)

(73) Assignee: R SOFTWARE INC., San Francisco, CA (US)

( * ) Notice: Subject to any disclaimer, the term of this patent is extended or adjusted under 35 U.S.C. 154(b) by 0 days.

(21) Appl. No.: 16/432,957

(22) Filed: Jun. 6, 2019

(65) Prior Publication Data

US 2020/0159597 A1      May 21, 2020

Related U.S. Application Data

(60) Provisional application No. 62/769,578, filed on Nov. 20, 2018.

(51) Int. Cl.
  *G06F 9/54*      (2006.01)
  *G06F 16/2458*   (2019.01)
  *G06F 16/2453*   (2019.01)

(52) U.S. Cl.
  CPC .............. *G06F 9/541* (2013.01); *G06F 9/547* (2013.01); *G06F 16/2471* (2019.01); *G06F 16/24539* (2019.01)

(58) Field of Classification Search
  CPC ............. G06F 9/54; G06F 9/541; G06F 9/547
  See application file for complete search history.

(56) References Cited

U.S. PATENT DOCUMENTS 7,433,835 B2 * 10/2008 Frederick ............. G06Q 20/102
                                                   705/26.1
9,553,787 B1 * 1/2017 Stickle .................... H04L 43/10
                          (Continued)

OTHER PUBLICATIONS

Mou et al. "Interactive Web service choice-making on extended QoS model" (Mar. 2006), Journal of Zhejiang University—Science A vol. 7, pp. 483-492 [retrieved from https://link.springer.com/article/10.1631/jzus.2006.A0483].*

(Continued)

*Primary Examiner* — Brian W Wathen
(74) *Attorney, Agent, or Firm* — Kligler & Associates Patent Attorneys Ltd

(57) ABSTRACT

A method for ranking a set of APIs for multiple software applications executing on respective servers, including initializing, by a first computer, respective ranking scores for the APIs, and receiving, from a plurality of second computers, multiple API calls to the APIs in the set. For each given API call to a given API in the set received from a given second computer, a given server executing a given software application including the given API is identified, the given API call is forwarded to the identified server, a response to the given API call is received from the identified server, performance metrics with respect to the given API call and response are computed, and the ranking score for the given API are updated based on the computed performance metrics. The APIs can be provided to the second computers responsively to the ranking scores, as updated in response to the requests.

11 Claims, 5 Drawing Sheets

(56) References Cited

U.S. PATENT DOCUMENTS

| | | | | |
|---|---|---|---|---|
| 2013/0132584 A1* | 5/2013 | Palladino | ................ | H04L 65/40 |
| | | | | 709/226 |
| 2015/0363493 A1* | 12/2015 | Laredo | ................. | G06F 16/951 |
| | | | | 707/770 |
| 2016/0239546 A1* | 8/2016 | Cuomo | ................. | G06F 16/248 |
| 2016/0267153 A1* | 9/2016 | Witkop | ................. | G06Q 10/00 |
| 2016/0292018 A1* | 10/2016 | Laredo | ...................... | G06F 9/54 |
| 2016/0294667 A1* | 10/2016 | Prabhakar | ............... | H04L 43/14 |
| 2018/0004585 A1* | 1/2018 | Aguilar Mares | ....... | G06F 9/547 |
| 2018/0232444 A1* | 8/2018 | Duesterwald | ............ | G06F 8/36 |
| 2019/0149425 A1* | 5/2019 | Larish | ................. | G06N 3/0454 |
| | | | | 706/16 |

OTHER PUBLICATIONS

Bianchini et al. "Model-Based Search and Ranking of Web APIs across Multiple Repositories" (2014), International Conference on Web Information Systems Engineering, pp. 218-233 [retrieved from https://link.springer.com/chapter/10.1007/978-3-319-11749-2_17].*

* cited by examiner

APPLICATION PROGRAMMING INTERFACE SCORING, RANKING AND SELECTION

CROSS-REFERENCE TO RELATED APPLICATIONS

This application claims the benefit of U.S. Provisional Patent Application 62/769,578, filed Nov. 20, 2018, which is incorporated herein by reference.

FIELD OF THE INVENTION

The present invention relates generally to application programming interfaces (APIs), and particularly to scoring and ranking web-based APIs.

BACKGROUND OF THE INVENTION

In computer programming, an application programming interface (API) is a set of building blocks that programmers can use to develop software applications. APIs enable two pieces of software to communicate by enabling one application to plug directly into the data and services of another application. Popular types of APIs include APIs for web-based systems, operating systems, database systems and computer hardware.

Along with the increasing number of deployed web-based systems, there is also an increasing number of software applications that access services provided by these systems via their respective web APIs. Web APIs are typically either Simple Object Access Protocol (SOAP) APIs or Representational State Transfer (REST) APIs. REST APIs are optimized for the web, offer a single uniform interface, and typically have excellent performance and scalability. SOAP APIs, while being more complex than REST APIs, typically offer tighter security.

Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The description above is presented as a general overview of related art in this field and should not be construed as an admission that any of the information it contains constitutes prior art against the present patent application.

SUMMARY OF THE INVENTION

There is provided, in accordance with an embodiment of the present invention, a method for ranking a set of application programming interfaces (APIs) for a plurality of software applications executing on respective servers, including initializing, by a first computer, respective ranking scores for the APIs, and receiving, from a plurality of second computers, multiple API calls to the APIs in the set. For each given API call to a given API in the set received from a given second computer, the method also includes identifying a given server executing a given software application including the given API, forwarding the given API call to the identified server, receiving, from the identified server, a response to the given API call, computing one or more performance metrics with respect to the given API call and response, and updating the ranking score for the given API based on the computed performance metrics. The method additionally includes providing the APIs in the set to the second computers responsively to the ranking scores, as updated in response to the requests.

In some embodiments, initializing the respective API ranking scores for the APIs includes initializing one or more respective API call ranking scores for each of the API calls for the APIs, wherein updating the API ranking score for the given API based on the computed performance metrics includes updating a given API call ranking score for the given API call based on the computed performance metrics, and wherein providing the APIs in the set to the second computers responsively to the ranking scores comprises providing the API calls to the second computers responsively to the API ranking scores. In additional embodiments the method may also include forwarding, by the first computer, the received responses to the respective second computers.

In further embodiments, providing the APIs in the set to the second computers responsively to the ranking scores includes selecting a given API responsively to its respective ranking score. In supplemental embodiments, the method may also include presenting, by one of the second computers on a display, the ranking scores for the APIs in the set.

In one embodiment, providing the APIs in the set to the second computers responsively to the ranking scores includes ranking the APIs in the set based on their respective ranking scores, and providing the ranked APIs to the second computers. In another embodiment, the method may also include presenting, by one of the second computers on a display, the ranked APIs in the set.

In some embodiments, the method may also include receiving from the second computers, respective status codes for the multiple requests for the API calls to the APIs, and wherein the performance metrics include the received status codes. In other embodiments, the method may also include receiving from the servers, respective status codes for the forwarded API calls, and wherein the performance metrics include the received status codes.

In additional embodiments, computing one or more performance metrics includes computing respective popularities of the APIs. In further embodiments, computing one or more performance metrics includes computing respective precision metrics for the API calls to the APIs based on their respective received responses. In supplemental embodiments, computing one or more performance metrics includes computing respective latencies for the API calls to the APIs.

There is also provided, in accordance with an embodiment of the present invention, a computer system for ranking a set of application programming interfaces (APIs) for a plurality of software applications executing on respective servers, including a memory, and a processor configured to initialize, in the memory, respective ranking scores for the APIs, and to receive, from a plurality of computing devices, multiple API calls to the APIs in the set. For each given API call to a given API in the set received from a given computing device, the processor is also configured to identify a given server executing a given software application including the given API, to forward the given API call to the identified server, to receive, from the identified server, a response to the given API call, to compute one or more performance metrics with respect to the given API call and response, and to update, in the memory, the ranking score for the given API based on the computed performance metrics. The processor is additionally configured to provide the APIs in the set to the computing devices responsively to the ranking scores, as updated in response to the requests.

There is further provided, in accordance with an embodiment of the present invention, a computer software product for ranking a set of application programming interfaces (APIs) for a plurality of software applications executing on respective servers, the product including a non-transitory computer-readable medium, in which program instructions are stored, which instructions, when read by a computer, cause the computer to initialize respective ranking scores for the APIs, and to receive, from a plurality of computing devices, multiple API calls to the API calls in the set. For each given API call to a given API call in the set received from a given computing device, the instructions, when read by the computer, cause the computer to identify a given server executing a given software application including the given API, to forward the given API call to the identified server, to receive, from the identified server, a response to the given API call, to compute one or more performance metrics with respect to the given API call and response, and to update the ranking score for the given API based on the computed performance metrics. The instructions, when read by the computer, also cause the computer to provide the APIs in the set to the computing devices responsively to the ranking scores, as updated in response to the requests.

There is additionally provided, in accordance with an embodiment of the present invention, a method, including defining, by a computer, a set of application programming interface (API) calls to a plurality of software applications that execute a specific operation on different, respective servers, the software applications having respective APIs. The method also includes, during a first time period, performing the specific operation multiple times by conveying, from the computer to different ones of the servers, first requests including respective API calls selected from the set, and receiving respective first responses to the first requests, including, based at least on the first responses, respective performance metrics for the APIs hosting the API calls, and ranking the APIs in the set based on the computed performance metrics. The method additionally includes, at a second time subsequent to the first time period, receiving, in the computer, an instruction to execute the specific operation, and performing the specific operation by automatically selecting one of the servers responsively to the ranking of the APIs, and conveying a respective API call to the selected one of the servers.

In some embodiments, computing respective performance metrics for the APIs includes computing respective performance metrics for the API calls, wherein ranking the APIs in the set includes ranking the API calls based on the computed performance metrics, and wherein selecting one of the servers responsively to the ranking of the APIs includes selecting one of the servers responsively to the ranking of the API calls.

In additional embodiments, the method may also include receiving, from the selected one or the servers, a second response to the conveyed respective API call.

In further embodiments, the computer includes a first computer and wherein the instruction to execute the specific operation is received from a second computer, and the method may also include forwarding, by the first computer, the received second response to the second computer.

In supplemental embodiments, the method may also include computing, based at least on the second response, updated respective performance metrics for the API hosting the conveyed API call, and re-ranking the APIs in the set based on the updated computed performance metrics.

There is also provided, in accordance with an embodiment of the present invention, an apparatus, including a memory, and a processor configured to define, in the memory, a set of application programming interface (API) calls to a plurality of software applications that execute a specific operation on different, respective servers, the software applications having respective APIs. The processor is also configured, during a first time period, to perform the specific operation multiple times by conveying, to different ones of the servers, first requests including respective API calls selected from the set, and receiving respective first responses to the first requests, to compute, based at least on the first responses, respective performance metrics for the APIs hosting the API calls, and to rank, in the memory, the APIs in the set based on the computed performance metrics. The processor is further configured, at a second time subsequent to the first time period, to receive an instruction to execute the specific operation, and to perform the specific operation by automatically selecting one of the servers responsively to the ranking of the APIs, and conveying a respective API call to the selected one of the servers.

There is further provided, in accordance with an embodiment of the present invention, a computer software product, the product including a non-transitory computer-readable medium, in which program instructions are stored, which instructions, when read by a computer, cause the computer to define a set of application programming interface (API) calls to a plurality of software applications that execute a specific operation on different, respective servers, the software applications having respective APIs. The instructions, when read by the computer, also cause the computer, during a first time period, to perform the specific operation multiple times by conveying, from the computer to different ones of the servers, first requests including respective API calls selected from the set, and receiving respective first responses to the first requests, to compute, based at least on the first responses, respective performance metrics for the APIs hosting the API calls, and to rank the APIs in the set based on the computed performance metrics. The instructions, when read by the computer, further cause the computer, at a second time subsequent to the first time period, to receive, in the computer, an instruction to execute the specific operation, and to perform the specific operation by automatically selecting one of the servers responsively to the ranking of the APIs, and conveying a respective API call to the selected one of the servers.

BRIEF DESCRIPTION OF THE DRAWINGS

The disclosure is herein described, by way of example only, with reference to the accompanying drawings, wherein.

DETAILED DESCRIPTION OF EMBODIMENTS

Overview

Figure 1:
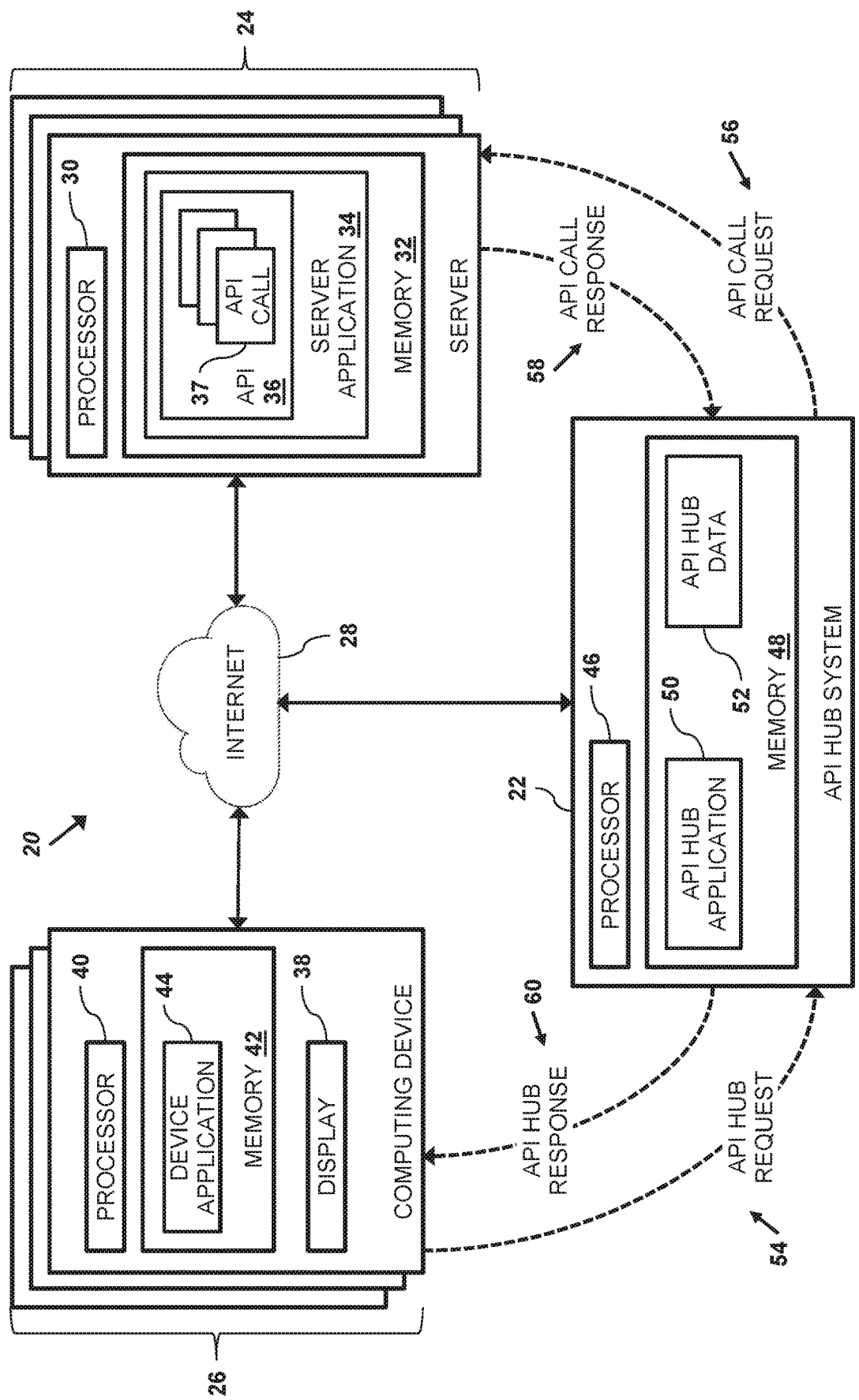
FIG. 1 is a block diagram that schematically shows a computing facility comprising an application programming interface (API) hub system configured to rank a set of APIs and a set of API calls based on their respective performance, in accordance with an embodiment of the present invention.

Along with the increasing number of users using the Internet to access online services via the Internet, the number of providers of these services has grown as well. For example, there are many providers that can provide services for performing operations such as sending an SMS, retrieving weather information and sending an email. Since each service provider has its own unique set of API calls, software developers are faced with the challenge of selecting one API from a set of APIs that perform a specific operation, and then coding their applications accordingly.

Embodiments of the present invention provide methods and systems for ranking a set of APIs for a plurality of software applications executing on respective servers. As described hereinbelow, respective ranking scores for the APIs are first initialized by a first computer, such as an API hub system. Upon receiving, from a plurality of second computers (e.g., computing devices such as smartphones or tablets) multiple API calls to the APIs in the set, the following steps can be performed for each given request, received from a given second computer, for a given API call to a given API in the set:

A given server executing a given software application comprising the given API is identified, and the given API call is forwarded to the identified server. Upon receiving, from the identified server, a response to the given API call, one or more performance metrics with respect to the given API call and response are computed, and the ranking score for the given API is updated based on the computed performance metrics. Finally, the APIs in the set are provided to the second computers responsively to the ranking scores, as updated in response to the requests.

In some embodiments, API call ranking scores and API call rankings can be computed for the API calls, and the API calls can be provided to the second computers responsive to the API call rankings.

In addition to computing ranking the scores for the API calls and providing the API calls responsively to the ranking scores, embodiments of the present invention provide methods and systems for dynamically selecting a given API call based on the ranking of the API hosting the given API call. Upon ranking the APIs in the set based on the computed performance metrics (as described supra) and receiving an instruction to execute the specific operation, the API hub system can perform the specific operation by automatically selecting one of the servers responsively to the ranking of the APIs, and conveying a respective API call to the selected one of the servers. In embodiments where the API call ranking scores and API call rankings are computed for the API calls, the API hub system can perform the specific operation by automatically selecting one of the servers responsively to the API call rankings, and conveying a respective API call to the selected one of the servers.

Systems implementing embodiments of the present invention enable a developer to include code in an application that instructs the API hub system to dynamically select, based on the rankings of the API ranking scores, a given API call to perform the specific operation. This enables rapid deployment of applications, since the developer only needs to include a single call to the API hub system to perform the specific operation. Additionally, since the performance of API calls can vary over time, the dynamic selection of the given API ensures that API calls having better performance metrics are selected at any given time.

System Description

FIG. 1 is a block diagram that schematically shows a computing facility 20 comprising an application programming interface (API) hub system 22 that computes ranking scores and rankings for APIs and API calls, in accordance with an embodiment of the present invention. In the configuration shown in FIG. 1, API hub system 22 communicates with respective pluralities of servers 24 and computing devices 26 via a data network 28 such as the Internet.

Each server 24 may comprise a server processor 30 that executes, from a server memory 32, a server application 34 that provides a service such as sending an SMS, providing information about the current weather, or sending an email. Each given server application 34 comprises a respective API 36 that enables another computer (e.g., system 22 or a given device 26) to interact with the given server application via a set of hosted API calls 37. In other words, each given API 36 comprises (i.e., hosts) one or more API calls 37 that enable computing devices 26 to access the given API. Examples of such interactions include requesting information from or storing data to the given server application. In some embodiments, a given API 36 may comprise a web API such as a REST API or a SOAP API.

Each computing device 26 may comprise a display 38 (e.g., an LED screen) that presents information to a user (not shown), and a device processor 40 that executes, from a device memory 42, a device application 44. In some embodiments (e.g., if a given computing device 26 comprises a smartphone or a tablet computer), display 38 may comprise a touchscreen that also accepts input from the user. In one embodiment, a given computing device 26 may also comprise a user input device such as a keyboard (not shown). In another embodiment a given computing device may be configured to operate without any connected display or input devices (e.g., a blade server).

API hub system 22 may comprise a system processor 46 and a system memory 48 that stores an API hub application 50 and API hub data 52. API hub data 52 is described in the description referencing FIG. 2 hereinbelow.

In embodiments of the present invention, a given device application 44 executing on a given computing device 26 conveys an API hub request 54 to API hub system 22. In a first request embodiment, the conveyed API hub request may comprise a specific API call 37. In this first embodiment, upon receiving the conveyed API call request, API hub application 50 conveys an API call request 56 comprising the specific API call to a given server application 34 executing on a given server 24. The given server application receives and processes the conveyed API call and conveys an API call response 58 to API hub application 50 on API hub system 22, which forwards the API call response to the given device application in an API hub response 60. Examples of API hub responses 60 are described in the description referencing FIG. 3 hereinbelow.

In a second request embodiment, the conveyed API hub request comprises a request for a specific operation. In this second embodiment, upon receiving the request for a specific operation, API hub application 50 identifies a given API call 37 that performs the specific operation, and conveys API call request 56 comprising the identified API call to a given server application 36 executing on a given server 24. The given server application receives and processes the conveyed API call and conveys an API call response 58 to API hub application 50 on API hub system 22, which forwards the API call response to the given device application in an API hub response 60. Identifying a given API call 37 that performs a specific operation is described in the description referencing FIG. 4 hereinbelow.

Processors 30, 40 and 46 comprise general-purpose central processing units (CPU) or special-purpose embedded processors, which are programmed in software or firmware to carry out the functions described herein. This software may be downloaded to API hub system 22, servers 24 and computing devices 26 in electronic form, over a network, for example. Additionally or alternatively, the software may be stored on tangible, non-transitory computer-readable media, such as optical, magnetic, or electronic memory media. Further additionally or alternatively, at least some of the functions of processors 30, 40 and 46 may be carried out by hard-wired or programmable digital logic circuits.

Examples of memories 32, 42 and 48 include dynamic random-access memories and non-volatile random-access memories. Additionally or alternatively, the memories may comprise non-volatile storage devices such as hard disk drives and solid-state disk drives.

In some embodiments, the functionality of some or all of servers 24, computing devices 26 and API hub system 22 may be deployed in a data cloud and/or as virtual machines in one or more computing facilities such as computing facility 20. In one embodiment, the API hub system that is described herein as a single computer may comprise multiple physical and/or virtual computers that comprise respective portions of API hub application 50 and/or API hub data 52. In other words, portions of API hub application 50 and/or API hub data 52 can be distributed over a plurality of virtual machines and/or physical computers.

In another embodiment, the API hub system and one or more of the servers that are described herein may comprise a single virtual machine or a single physical computer. In other words, API hub application 50 and one or more server applications 34 may execute on a single virtual machine or a single physical computer.

Figure 2A:
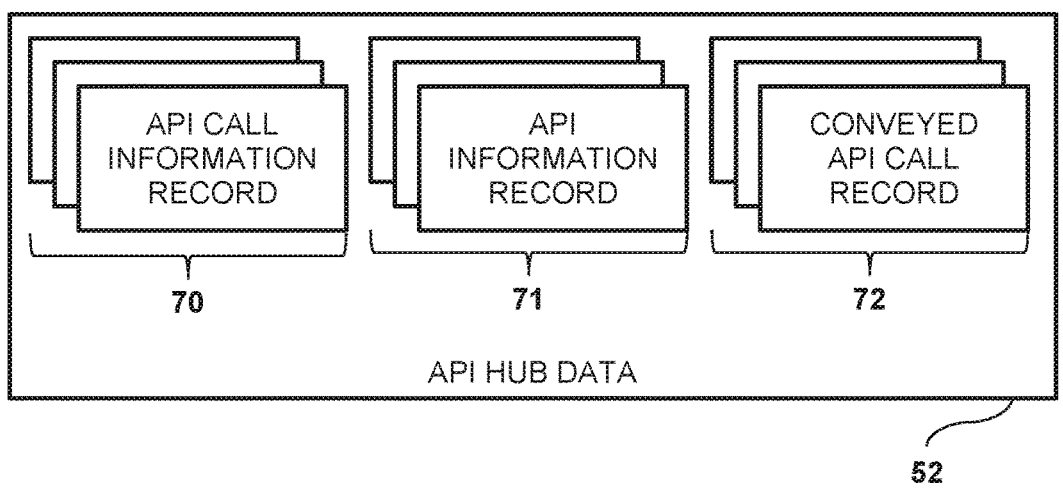
FIGS. 2A-2D, referred to collectively as FIG. 2, are block diagrams that schematically illustrate examples of data stored in a memory of the API hub system, in accordance with an embodiment of the present invention.

FIGS. 2A-2D, also referred to collectively as FIG. 2, are block diagrams that schematically show data components stored in API hub data 52, in accordance with an embodiment of the present invention. As shown in FIG. 2A, API hub data comprises multiple API call information records 70, multiple API information records 71 and multiple conveyed API call records 72. In embodiments described herein, each API call 37 has a corresponding API call information record 70, each API 36 has a corresponding API information record 71, and each API call request 56 to any given API 36 has a corresponding conveyed API call record 72.

Figure 2B:
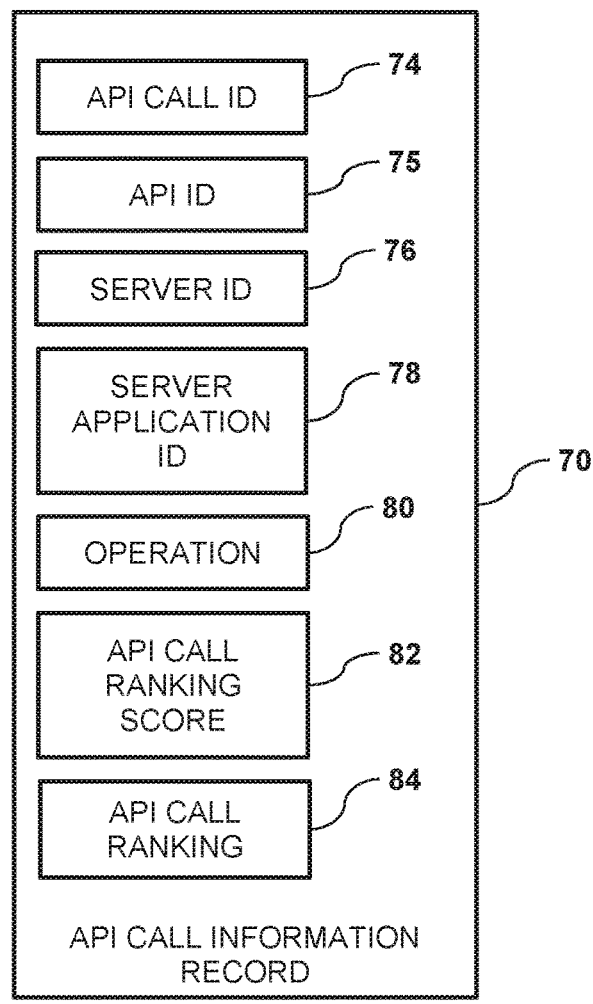

As shown in FIG. 2B, each API call information record 70 comprises an API call identifier (ID) 74, an API ID 75, a server ID 76, a server application ID 78, an operation 80, an API call ranking score 82 (also referred to herein as an API score) and an API call ranking 84. Each given API call 37 has a corresponding record 70 comprising a unique API call ID 74. In each record 70, the API call ID references a given API call 37, the API ID references a given API 36 (i.e., the API hosting the given API call), the server application ID references a given server application 34 that handles the given API call, the server ID references a given server 24 that executes the given server application, and the operation 80 references a given operation that is performed by the API call corresponding to the given API call ID. As described supra, examples of operations include sending an SMS, retrieving the current weather, and sending an email. Additional examples of operations include identifying an object in an image (i.e., image recognition), translating text from a first language to a second language, and retrieving a current quote for a stock price of a publicly traded company, retrieving a current currency exchange rate, and submitting a search query (e.g., to a database management system or a search engine).

Based on data that processor 46 collects and stores to conveyed API call records 72, the system processor computes, for each API call 37, a respective API call ranking score 82 and a respective API call ranking 84, and stores the API call ranking scores and the API call rankings to the corresponding API call information record. Computing the API call ranking scores and the API call rankings is described in the description referencing FIG. 3 hereinbelow.

Figure 2C:
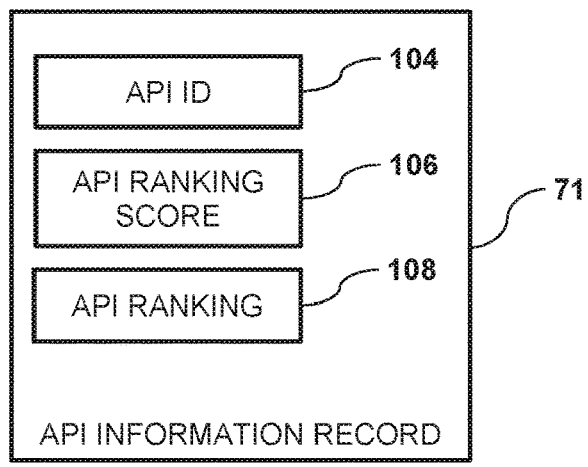

As shown in FIG. 2C, each API information record 71 comprises an API ID 104, an API ranking score 106 and an API ranking 108. Each given API 36 has a corresponding record 71 comprising a unique API ID 104. In each record 71, the API ID references a given API 36, and based on data that processor 46 collects and stores to conveyed API call records 72, the system processor computes, for each API 36, a respective API ranking score 106 and a respective API ranking 108, and stores the API ranking scores and the API rankings to the corresponding API information record. Computing the API ranking scores and the API rankings is described in the description referencing FIG. 3 hereinbelow.

Figure 2D:
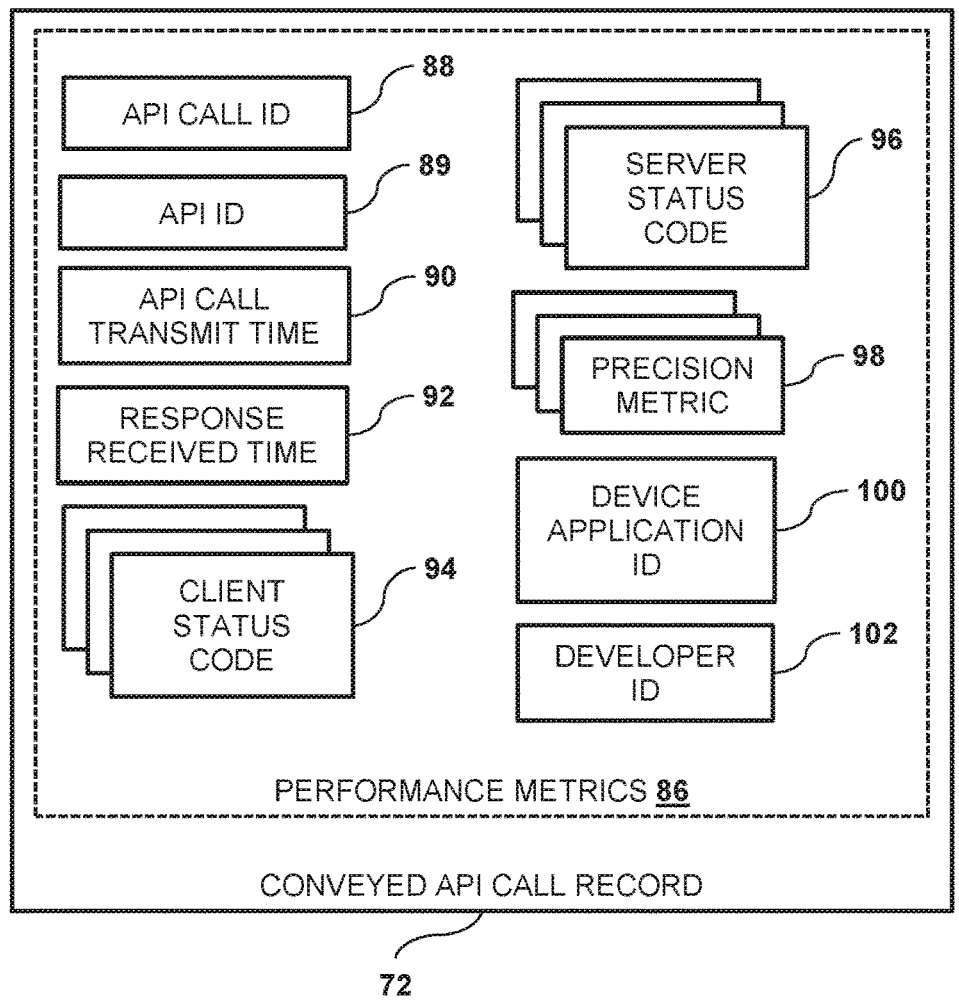

Each given conveyed API call record 72 corresponds to a given API call 37 and as shown in FIG. 2D, each of the API call records comprises a set of performance metrics 86 that comprises:

An API call identifier (ID) 88 that corresponds to the given API call.

An API ID 99 that corresponds to a given API 36 hosting the given API call.

An API call transmit time 90 indicating a date and time that API hub application 50 conveyed the given API call to a given server 24.

A response received time 92 indicating a date and time that API hub application 50 received a response from the given server for the given API call.

A set of client status codes 94. For example, client status codes 94 may comprise 4xx errors that are generated by the given server and indicate any errors in the given API call request. In an alternative embodiment, API hub application 50 can generate a given 4xx error (or any other client status code) upon analyzing the given API hub request from a given computing device 26. If API hub application 50 detects a 4xx error resulting from the given API hub request, the API hub application can convey the 4xx error to the given computing device that conveyed the API hub request. Additionally, if API hub application 50 detects a 4xx error resulting from the given API hub request, the API hub application can refrain from conveying any API call request 56 resulting from the given API hub request.

A set of server status codes 96 such as any errors (e.g., 5xx errors) on the server that processed the API call.

A set of precision metrics 98. In a first example, if the given API call is for a given server application 34 that performs facial recognition, the precision metrics may include a confidence score and an accuracy measure (e.g., was the result of a facial recognition API request correct?). In a second example, if the given API call is for a stock quote, a given precision metric may comprise a recency of the stock quote. In a third example, if the given API call is for a currency exchange rate, a given precision metric may comprise a recency of the exchange rate. In a fourth example, if the given API call is for a query to a search engine, a given precision metric may comprise a relevance score of the query results. In a fifth example, if the given API call is for user or company data, a given precision metric may comprise how many fields (e.g., email address, mailing address, website URL, Twitter link, GitHub link) are returned.

A device application ID 100 that corresponds to a given device application 44 that requested the given API call.

A developer ID 102 that corresponds to a software developer that developed the given software application that requested the given API call.

Scoring and Ranking APIs

Figure 3:
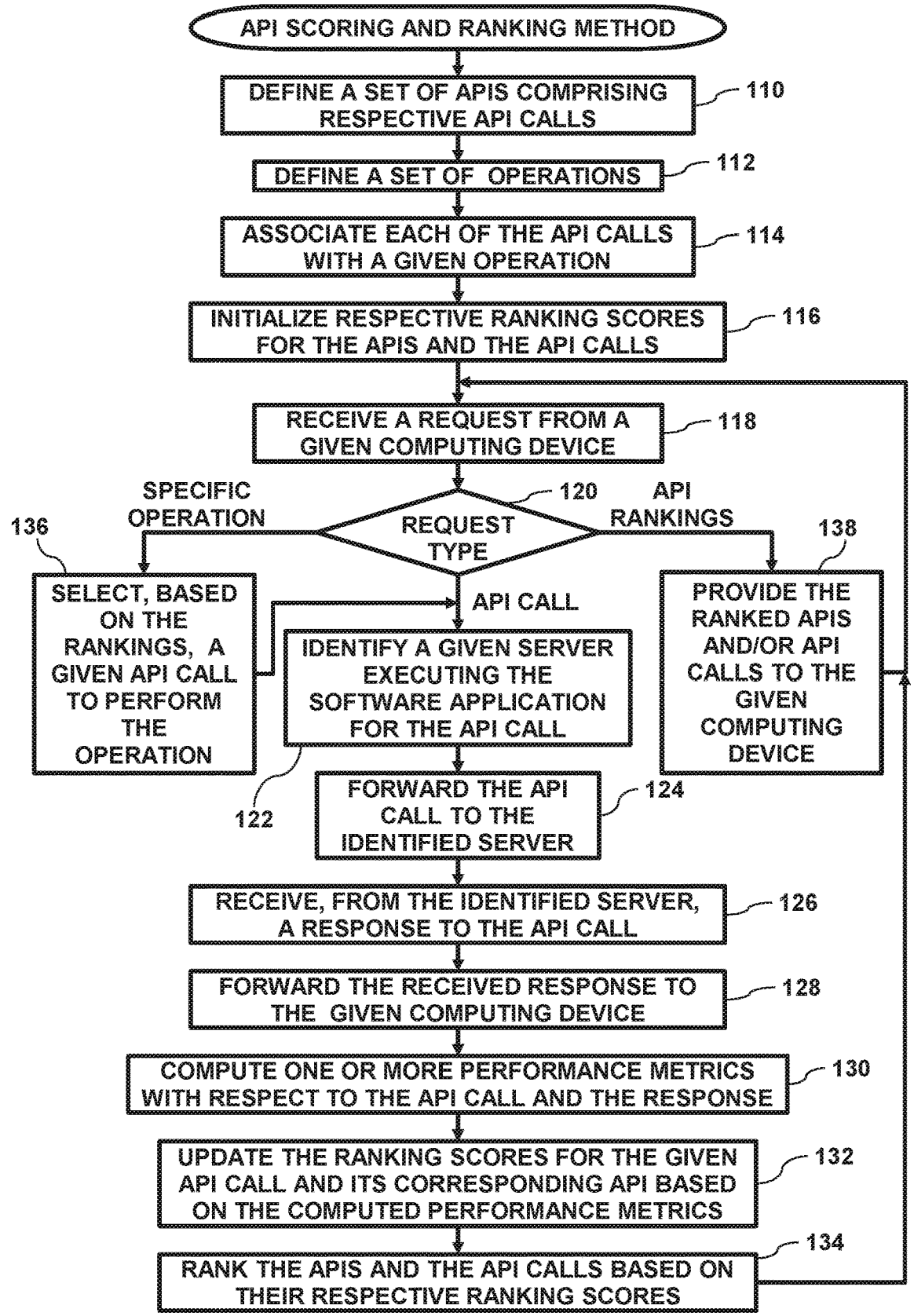
FIG. 3 is a flow diagram that schematically illustrates a method of computing API ranking scores and API call ranking scores, and ranking the APIs and the API calls responsively to the computed scores, in accordance with an embodiment of the present invention.

FIG. 3 is a flow diagram that schematically illustrates a method of computing API call ranking scores 82 and API ranking scores 106, and ranking the APIs and the API calls responsively to the computed scores, in accordance with an embodiment of the present invention. In a first definition step 110, processor 46 defines a set of APIs 36 comprising respective sets of API calls 37. In some embodiments, processor 46 can define the set of APIs 36 by generating a respective API information record 71 for each of the APIs. Likewise, processor 46 can define the set of API calls 37 by generating a respective API call information record 70 for each of the API calls.

Upon generating each given record 71 for each given API 36, processor 46 can store, to the given API information record, a unique API ID 104 corresponding to the given API. Likewise, upon generating each given record 70 for each given API call 37, processor 46 can store, to the given API call information record, a unique API call ID 74 corresponding the given API call, a given server application ID 78 referencing the server application that processes the given API call, and a given server ID that references the server executing the given server application.

In a second definition step 112, processor 46 defines a set of operations 80, and in an association step 114, the system processor associates each given API call 37 with a given operation 80. For example, a given operation 80 may comprise "weather forecast", and processor 46 can associate this category with a first given API call ID 74 for the "/weather/forecast/daily" API call from the ClimaCell API by ClimaCell (Boston, Mass., U.S.A.), and a second given API call ID 74 for the "Current Weather Data of a location" API call from the Weather API by Weatherbit (Raleigh, N.C., U.S.A.).

In an initialization step 116, processor 46 initializes all the API call ranking scores in the API call information records and all the API ranking scores in the API information records to an initial value. In some embodiments, the initialized value for each given API call ranking score 82 and each given API ranking score 106 may be zero or a negative number in order to indicate that processor 46 has not yet computed the API call ranking score for the given API call or the API ranking score for the given API.

In a first receive step 118, processor 46 receives a given API hub request 54 from a given computing device 26, and in a determination step 120, the system processor determines if the given API hub request comprises a request for a given API call 37, a request for a given operation 80 or a ranking request. In one embodiment, a given ranking request may comprise a request for respective API call ranking scores 82 and/or respective API rankings 84 for one or more API calls

37. In another embodiment, a given ranking request may comprise a request for respective API ranking scores 106 and/or respective API rankings 106 for one or more APIs 36.

If the received request is for a given API call 37, then in an identification step 122, processor 46 identifies a given server 24 executing the server application whose respective API 36 is configured to handle the given API call, and in a first forwarding step 124, the system processor forwards the given API call to the server application on the identified server. For example, if API hub application 50 comprises the RapidAPI™ platform produced by R Software Inc. (San Francisco, Calif., U.S.A.) then the received API hub request may comprise:

```
GET /weather/forecast/daily?lon=-122.43& lat=37.7
HTTP/1.1
Host: climacell-microweather-v1.p.rapidapi.com
X-RapidAPI-Key: <<User's RapidAPI App Key>>
```

In some embodiments (e.g., using the RapidAPI™ platform), this received API request can be generated in multiple programming languages. In a first RapidAPI™ platform example, the received API hub request uses Node.js and the Unirest library:

```
unirest.get("https://climacell-microweather-
v1.p.rapidapi.com/weather/forecast/daily?lon=-
122.43&lat=37.7")
.header("X-RapidAPI-Key", "<<User's RapidAPI App Key>>")
.end(function (result) {
    console.log(result.status, result.headers, result.body);
});
```

In a second RapidAPI™ platform example, the received API hub request uses Node.js and the Request library:

```
var request = require("request");
var options = { method: 'GET',
    url: 'https://climacell-microweather-
v1.p.rapidapi.com/weather/forecast/daily',
    qs: { lon: '-122.43', lat: '37.7' },
    headers: { 'X-RapidAPI-Key': '<<User's RapidAPI App Key>>'
} };
request (options, function (error, response, body) {
    if (error) throw new Error(error);
    console.log(body);
});
```

In a third RapidAPI™ platform example, the received API hub request uses Python and the Unirest library:

```
response = unirest.get("https://climacell-microweather-
v1.p.rapidapi.com/weather/forecast/daily?lon=-
122.43&lat=37.7",
    headers={
        "X-RapidAPI-Key": "<<User's RapidAPI App Key"
    }
)
```

In a fourth RapidAPI™ platform example, the received API hub request uses Python and the Requests library:

```
import requests
url = "https://climacell-microweather-
v1.p.rapidapi.com/weather/forecast/daily"
querystring = {"lon":"-122.43","lat":"37.7"}
```

-continued

```
payload = ""
headers = {'X-RapidAPI-Key': '<<User's RapidAPI App Key>>'}
response = requests.request("GET", url, data=payload,
headers=headers, params=querystring)
print(response.text)
```

In a fifth RapidAPI™ platform example, the received API hub request uses PHP and the Unirest library:

```
$response = Unirest\Request::get("https://climacell-
microweather-v1.p.rapidapi.com/weather/forecast/daily?lon=-
122.43&lat=37.7",
    array(
        "X-RapidAPI-Key" => "<<User's RapidAPI App Key"
    )
);
In PHP using HttpRequest library
$request = new HttpRequest( );
$request->setUrl('https://climacell-microweather-
v1.p.rapidapi.com/weather/forecast/daily');
$request->setMethod(HTTP_METH_GET);
$request->setQueryData(array(
    'lon' => '-122.43',
    'lat' => '37.7'
));
$request->setHeaders(array(
    'X-RapidAPI-Key' => '<<User's RapidAPI App Key'
));
try {
    $response = $request->send( );
    echo $response->getBody( );
} catch (HttpException $ex) {
    echo $ex;
}
```

Upon receiving API hub request, the RapidAPI™ platform can translate the request into the following API call 37:

```
GET /weather/forecast/daily?lon=-122.43& lat=37.7
HTTP/1.1
Host: <<API Provider's (ClimaCell's) base url provided to
RapidAPI>>
X-RapidAPI-Key: <<User's RapidAPI App Key>>
X-RAPIDAPI-VERSION: <<Version Number>>
X-RAPIDAPI-USER: <<Username of User>>
X-RAPIDAPI-PROXY-SECRET: <<API Provider's Secret Key>>
X-RAPIDAPI-SUBSCRIPTION: <<Plan user is subscribed to>>
    + Additional headers and parameters to be included as
    defined by API provider
```

In addition to transforming a given API hub request 54 into a given API call request 56, processor 46 can add additional information to the API call request. For example, processor 46 can add additional headers to the given API call request in order to notify a given server 24 that the given API call request is from API hub application 50 (e.g., the RapidAPI™ platform). In some embodiments, the additional information may comprise billing information.

In a second receive step 126, processor 46 receives a given API call response 58 for the forwarded API call request, and in a second forwarding step 128, processor 46 forwards, to the given computing device (i.e., that conveyed the given API hub request), the received API call response in a given API hub response 60.

As described supra, processor 46 can update a given API hub request 54 with additional information such as billing information. In some embodiments, upon receiving a given API call response 58, processor 46 can filter out some of the information in the given API call response when generating the corresponding API hub response. For example, processor 46 can filter out any billing calculations from the given API call responses. Additionally or alternatively, processor 46 can add information such as API usage data to the API hub response.

In a compute step 130, processor 46 computes performance metrics 86 for the given API call and its respective response 58, and stores the computed performance metrics to a respective conveyed API call record 72. In some embodiments, computing and storing the performance metrics may comprise:

Identifying and storing a given API call ID 88 corresponding to the received API call.

Storing, to API call transmit time 90, the date and time that processor 46 forwarded the API call to the given server.

Storing to response received time, the date and time that processor 46 received the API call response for the forwarded API call.

Storing, to client status codes 94, any 4xx errors that processor 46 received from the identified server that processed the forwarded API call request.

Storing, to server status codes 96, any 5xx errors that processor 46 received from the given server processing the forwarded API call.

Computing and storing any precision metrics 98 for the processed API call. As described supra, examples of performance metrics 98 include, but are not limited to confidence scores and accuracy measures.

Identifying and storing a given device application ID 100 corresponding the given device application that sent the received API hub request, and a given developer ID 102 corresponding to the software developer that coded the given device application.

In a scoring step 132, processor 46 updates the API call ranking score for the given API call, and updates the API ranking score for the API that hosts the given API call. In embodiments of the present invention, each given API call ranking score 82 for a given API call 37 is based on performance metrics 86 that processor 46 collects and stores to conveyed API call records 72 for API call requests 56 and API call responses 58 for the given API call during a specific time period (e.g., 30 days). Likewise, each given API ranking score 106 for a given API 36 is based on performance metrics 86 that processor 46 collects, during a specific time period (e.g., 30 days), and stores to conveyed API call records 72 for API call requests 56 and API call responses 58 for the API calls hosted by the given API.

In one embodiment, processor 46 can compute a given API ranking score 82 for a given API call 37 for a specific time period by first computing an error rate for the given API call using a formula such as:

$$\text{ErrorRate} = w1 * \text{ErrorRate}C + w2 * \text{ErrorRate}S$$

The data used to compute ErrorRate can be collected from conveyed API call records 72 whose respective API call ID 88 corresponds to the given API and whose respective API call transmit times 90 are within the specific time period. In this formula:

ErrorRateC is the error rate for the client errors (e.g., in client status codes 94) resulting from API call requests 56 for the given API call during the specific time period. For example, processor 46 can compute ErrorRateC using the following formula:

$$\text{ErrorRate}C = (\text{Number of 4xx errors})/\text{TotalCalls}$$

ErrorRateS is the error rate for the number the server errors (e.g., in server status codes 96) resulting from API call requests 56 for the given API call during the specific time period. For example, processor 46 can compute ErrorRateS using the following formula:

ErrorRateS=(Number of 5xx errors)/TotalCalls

TotalCalls are the number of API call requests 56 (i.e., the number of conveyed API call records 72) for the given API call during the specific time period.

w1 and w2 are weights (i.e., w1+w2=1) that can be empirically chosen. For example, since the server errors (i.e., in server status codes 96) are typically more important than the client errors (i.e., in client status codes 94), w1 may be in the range of 0.1 to 0.3, and w2 may be in the range of 0.7 to 0.9. In one example, w1=0.2 and w2=0.8.

Upon computing the error rate for each API call 37, processor 46 can assign a raw ranking to each of the API calls based on their respective error rates. The raw rankings of the API calls are typically in order of their respective error rates. For each given API call 37, processor 46 can then convert the ErrorRate score (e.g., having a range 1 to N) to a normalized score E having a range of, for example 10 to 0 (E) using the following formula:

$E=10*(N-e)/N$ where N is the total number of unique API call IDs 88 (i.e., the number of API call requests 56 comprising the given API call) in the conveyed API call records for the specific time period, and e is the raw rank of the given API call based on its respective ErrorRate.

For example, if N=1 and each API call 37 has a unique ErrorRate, then the raw rank of the API call having the lowest error rate (e.g., 0 errors) is 1, and the raw rank of the API call having the highest ErrorRate is 200. In some instances, one or more of the API calls have the same ErrorRate, and therefore have the same raw rank (e.g., three of the API calls can have zero errors and therefore have the same raw rank of 1). In these instances, the raw rank of the one or more API calls 37 having the highest ErrorRate will be less than N.

Continuing the example, the normalized score E for the API call whose raw rank is 1 is $E=10*(200-1)/200=9.95$ and the normalized score E for the API call whose raw rank is N (if N=200), is $E=10*(200-200)/200=0.$ Therefore, using the formulas described hereinabove, processor 46 can convert raw ranks of 1 (i.e., best) to N (i.e., worst) (e.g., 200, 2,000 or 20,000 etc.) to a normalized score E for that component (in this case ErrorRate) from 10 (where closest to 10 is best) to 0.

In addition to computing E, processor 46 can compute these score components for the API call ranking score for the given API call:

Average Latency Ranking (ALR). In embodiments of the present invention, latency indicates an amount of time it takes for a given server 24 to process a given API call request 56. Processor 46 can compute the latency for a given API call request 56 by subtracting the API call transmit time for the given API call request from the response received time for the given API call request. For each given API call 37, processor 46 can compute an average of all the latencies of API call requests 56 for the given API call during the specific time period. Processor 46 can then compute a raw average latency ranking (RALR) for each of the API calls based on their respective computed average latencies, and compute a normalized average latency ranking for each given API call 37 using the formula:

$ALR=10*(N-RALR)/N$

Medial Latency Ranking (MLR). For each given API call 37, processor 46 can compute a median of all the latencies of API call requests 56 for the given API call during the specific time period. Processor 46 can then compute a raw medial latency ranking (RMLR) for each of the API calls based on their respective computed median latencies, and compute a normalized medial latency ranking for each given API call 37 using the formula:

$MLR=10*(N-RMLR)/N$

Total Calls Ranking (TCR). Processor 46 can compute a raw total call ranking (RTCR) for each given API call 37 based on the respective numbers of API call requests 56 for each given API call 37 during the specific time period. Processor 46 can then compute a normalized total calls ranking for each given API call 37 using the formula:

$TCR=10*(N-RTCR)/N$

Active Developers Ranking (ADR). Processor 46 can compute a raw active developers ranking (RADR) for each given API call 37 based on the respective numbers of unique developer IDs 102 of device applications 44 that generated API call requests 56 for each given API call 37 during the specific time period. Processor 46 can then compute a normalized active developers ranking for each given API call 37 using the formula:

$ADR=10*(N-RAD)/N$

In embodiments of the present invention, the determined number of unique developer IDs 102 for the given API call, and the determined number of API call requests 56 for the given API call may also be referred to as popularity parameters. Additionally, while the score components described hereinabove generate a ranking between 0 and 10, generating normalized score for any numerical range is considered to be within the spirit and scope of the present invention.

Upon computing all the score components described supra, processor 46 can compute the API call ranking score (ARS) for a given API 37 using a formula such as:

$ARS=We*E+Wal*ALR+Wml*MLR+Wtc*TCR+Wad*ADR$ where We, Wal, Wml, Wtc and Wad are respective weights for E, ALR, MLR, TCR and ADR, and wherein $We+Wal+Wml+Wtc+Wad=1$ Similar to w1 and w2 described supra, a higher weight for a given score component indicates a higher importance for the given score component. For example, an analyst might determine that TCR and ADR are more important (i.e., than E, ALR and MLR) and assign them higher weight values.

In an additional embodiment, processor 46 can incorporate any computed precision metrics 98 in the API ranking score for a given API call 37. In this embodiment, the computed precision metrics may have respective weights, similar to the weights described supra.

When computing the API call ranking scores, processor 46 can first compute, for each given API call 37, a raw rank "RPR" of the given API call based on its precision. Therefore, RPR=1 corresponds to the API call(s) with the highest precision (e.g., 1, in a 0 to 1 range of precision) and RPR=N, (e.g., 200) corresponds to the API call(s) with the lowest precision (i.e., assuming each of the API calls has a different precision). Processor 46 can then compute a normalized score PR for the API call whose rank is 1 as $$PR=10*(200-1)/200=9.95,$$

and can then compute the normalized score PR for the API whose rank is N (e.g., N=200) as $$PR=10*(200-200)/200=0.$$

Therefore, processor 46 can convert a rank from 1 (i.e., best) to N (i.e., worst) to a normalized score for that component (i.e., precision) from 10 (where closest to 10 is best) to 0 (worst) as $$PR=10*(N-RPR)/N$$

In operation, processor 46 can then update the ARS (API Ranking Score) for each of the API calls using the following formula:

$$ARS=We*E+Wal*ALR+Wml*MLR+Wtc*TCR+Wad*ADR+Wp*PR$$

where We, Wal, Wml, Wtc, Wad, and Wp are respective weights for E, ALR, MLR, TCR, ADR, and PR, and where $$We+Wal+Wml+Wtc+Wad+Wp=1$$

In a ranking step 134, processor 46 ranks APIs 36 based on their respective API ranking scores, ranks APIs 37 based on their respective API call ranking scores, and the method continues with step 118. To rank N API calls 36, processor 46 can assign, based on API ranking scores 106, respective API rankings 108 between 0 and N to each of the APIs. Likewise, to rank M API calls 37, processor 46 can assign, based on API call ranking scores 82, respective API call rankings 84 between 0 and M to each of the API calls.

In the steps described hereinabove, processor 46 computes, based on performance metrics 86 in conveyed API call records 72 during a specific time period, respective API call ranking scores 82 and respective API call rankings 84 for each given API call 37. In a similar manner to computing respective API call ranking scores 82 for API calls 37, processor 46 can use the formulas described supra to compute, based on performance metrics 86 in conveyed API call records 72 during a specific time period, respective API ranking scores 106 for each given API 36. Likewise, in a similar manner to computing respective API call rankings 84 for API calls 37, processor 46 can use the formulas described supra to compute, based on performance metrics 86 in conveyed API call records 72 during a specific time period, respective API rankings 108 for each given API 36. In operation, processor 46 computes API call ranking scores 82 and API call rankings 84 by aggregating and analyzing performance metrics 86 stored in conveyed API call records 72 at the API call ID level, and computes API ranking scores 106 and API rankings 108 by aggregating and analyzing the performance metrics stored in the conveyed API call records at the API ID level.

Returning to step 120, if the given API hub request comprises a request for a specific operation 80, then in a selection step 136, processor 46 can select a given API call 37 based on its respective API call ranking 84 or its respective API ranking 108, and the method continues with step 122. An embodiment for selecting a given API call 37 based on its respective API call ranking score 84 or its respective API ranking 108 is described in the description referencing FIG. 4 hereinbelow.

In a first embodiment, the computing device that conveyed the API hub request for a given operation 80 (e.g., a weather forecast) can store a list of API calls 37 that can be used to process the given operation. In this embodiment, the computing device can analyze the received API hub response in order to identify which API 36 responded to the conveyed request, and extract the results of the operation from the received API hub response accordingly.

In a second embodiment, the computing device (i.e., that conveyed the API hub request) or the API hub system can specify a fixed response format for all the API hub responses for the given operation, and define respective mappings between the fixed response format and each of the API call responses for the given operation. In this embodiment, upon receiving a given API call response for the given operation, processor 42 (or processor 40) can use the mappings to translate the API call responses to the API hub responses.

Returning to step 120, if the given API hub request comprises a request for one or more API call rankings 84 and/or API rankings 108, then processor 46 can provide the requested API call rankings and/or the requested API rankings to the given computing device (i.e., a given device application 44 executing on the given computing device) in a responding step 138, and the method continues with step 118. In some embodiments, in addition to providing the requested API call rankings and/or the requested API rankings processor 46 can also provide the corresponding API call ranking scores 82 and/or the corresponding API ranking scores 106 in response to the request.

In one embodiment, providing the requested API rankings may comprise selecting one or more API calls 37 based on their respective API call rankings 84 or the respective API rankings 108 of the APIs hosting the one or more API calls, as described in the description referencing FIG. 4 hereinbelow. In another embodiment, processor 46 can provide the request API rankings by conveying API call rankings 84, API call ranking scores 82, API rankings 108, or API ranking scores 106 to the given computing device. In a further embodiment, processor 46 can provide the request API rankings by conveying the ranked API calls (i.e., in order of their respective API call rankings 84 or their respective API rankings 108) to the given computing device.

In some embodiments, the given computing device can present, on its respective display 38, API calls 37 along with their respective API call rankings 84 and/or API call ranking scores 82. Likewise, the given computing device can present, on its respective display 38, API calls 37 along with their respective conveyed API rankings 108 and/or API ranking scores 106 (i.e., of the APIs hosting the API calls).

Automatic API Selection

Figure 4:
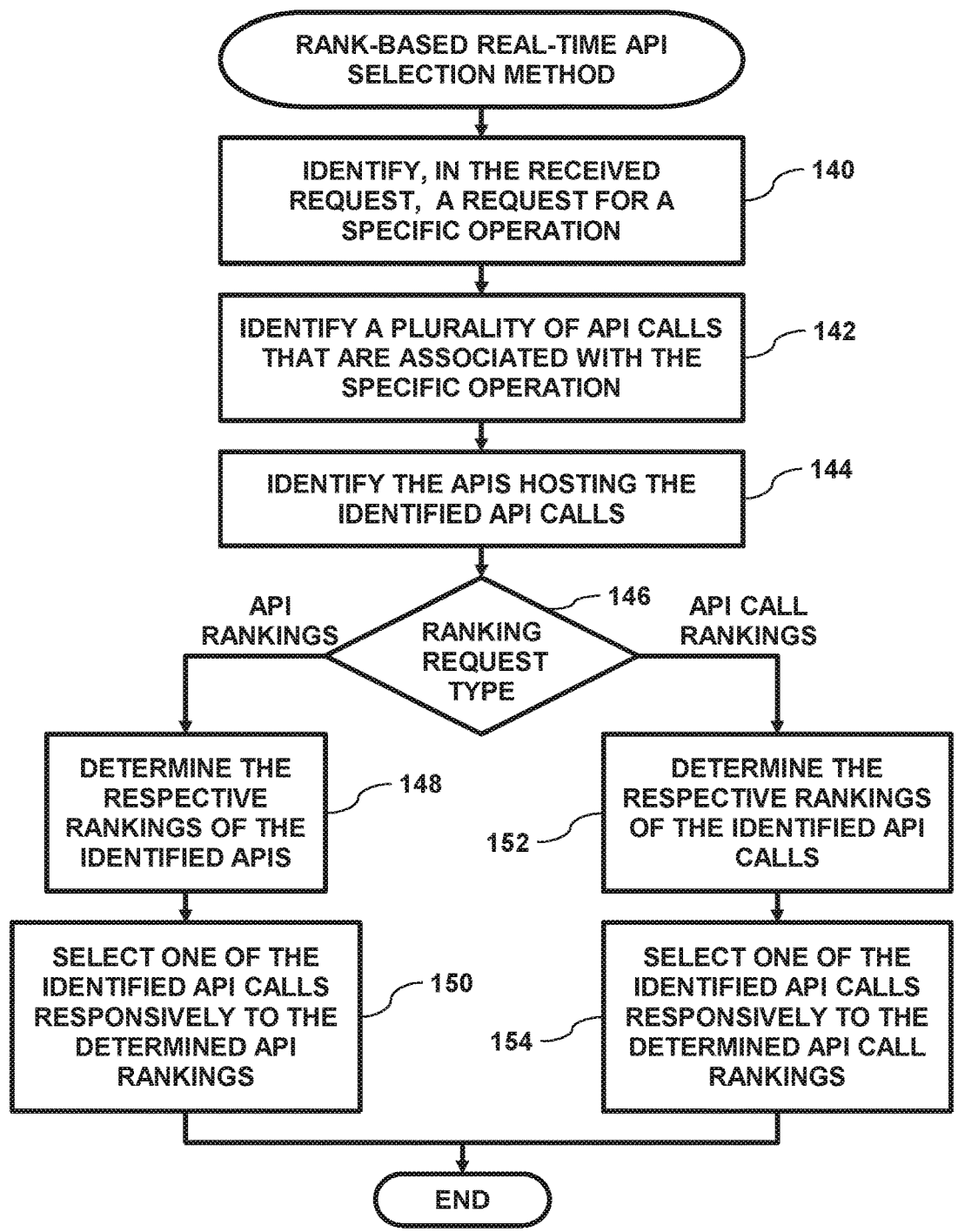
FIG. 4 is a flow diagram that schematically illustrates a method of using the computed scores to select a given API call, in accordance with an embodiment of the present invention.

FIG. 4 is a flow diagram that schematically illustrates a method of using the computed API ranking scores to select a given API call 37, in accordance with an embodiment of the present invention. In a first identification step 140, processor 46 identifies that the API hub request received in step 118 (as described in the description referencing FIG. 3 hereinabove) comprises a request to perform a specific operation (e.g., to send an SMS or to retrieve a weather forecast).

The following is an example of a given API hub request 54 when API hub application 50 comprises the RapidAPI™ platform:

```
RapidAPI_Call (API:default_API,
               category:weather,
               optimize_for:api_score,
               parameters:[location,
                           super_set_of_parameters])
``` where

API:default_API. This parameter identifies a given API call 37 as a "default", which processor 46 can use to perform the specific operation that was requested in step 140. Processor 46 can use the default API call if (a) all the API calls that perform the specific operation have the same ranking, or (b) the API calls for performing the specific operation do not (yet) have respective rankings.

category:weather. This parameter instructs the RapidAPI™ platform to select a set of API calls 37 whose respective operations 80 are "weather" (e.g., provide weather forecast information).

optimize_for:api_score. This parameter (along with category:weather) instructs the RapidAPI™ platform to select a given API call 37 having the highest API ranking score 82 in the set of the API calls whose respective operations 80 are "weather".

parameters:[location, super_set_of_parameters]. These are parameters for the selected API call. Location indicates a location for the weather forecast information, and super_set_of_parameters comprises a set of parameters that works across all API calls 37 in the "weather" whose respective operation 80 is "weather". For example, if the respective operation 80 is "weather", then the parameters (i.e., for super_set_of_parameters) may include:

Weather by address (e.g., 164, Townsend St., San Francisco, Calif., 94107)
Weather by city (e.g., San Francisco)
Weather by geocode (latitude/longitude)
Weather for a specific date/time
Weather in the last 12 hours In the example described hereinabove (i.e., where the operation is "weather"), super_set_of_parameters typically includes all parameters for all possibilities of API calls 37 for the operation (e.g., city, geocode latitude/longitude, address, date/time).

In some embodiments, API hub application 50 can identify, based on parameters provided in a given API hub request 54 (i.e., not the super_set_of_parameters), any API calls 37 that can be called (i.e., without errors) using the provided parameters, and use the highest rated identified API call in the API call request for a given API operation. In additional embodiments, API hub application 50 can derive parameters required for a given API call even if the API hub request did not explicitly include the required parameters. For example, API hub application 50 can receive a given API hub request 54 to perform a given operation. If the received API hub request includes latitude/longitude values, and API hub application 50 identifies, for the given operation, a given API call 37 that requires a city name, the API hub application can covert the latitude/longitude values to a city name.

In a second identification step 142, processor 46 identifies a plurality of API calls 37 that can perform the specific operation. For example, processor 46 can scan API call information records 70 to identify a plurality of the API call information records whose respective operation 80 matches the specific operation, and then identify the API calls corresponding to the API call IDs in the identified call information records.

In a third identification step 144, processor 46 identifies the APIs that are hosting the API calls identified in step 142.

In embodiments of the present invention, the received request (i.e., the request received in step 118 of the flow diagram presented in FIG. 3) may also comprise a ranking request type. Therefore, as described hereinbelow, processor 46 can select a given API call 37 based on either (a) its respective API call ranking 84 (or its respective API call ranking score 82), or (b) the API ranking (or the API ranking score) for a given API 36 hosting the given API call.

In a decision step 146, if the ranking request type is for API rankings, then in a first determination step 148, processor 46 determines the respective API rankings 108 (or respective API ranking scores 106) for the APIs identified in step 144. In a first selection step 150, processor 46 selects one of the identified API calls responsively to the determined API rankings (or the determined API ranking scores), and the method ends.

Typically, the selected API call has the highest API ranking score 106 and therefore the highest API ranking (i.e., of the APIs identified in step 144). In an alternative embodiment, processor 46 can perform step 150 by selecting, from the APIs identified in step 144, the API having the lowest average latency or the lowest error rate. In this alternative embodiment, processor 46 can compute the API ranking scores based on one or more performance metrics 86 such as latency and error count.

Returning to step 146, if the ranking request type is for API call rankings, then in a second determination step 152, processor 46 determines the respective API call rankings 84 (or respective API call ranking scores 82) of the API calls identified in step 142. In a second selection step 154, processor 46 selects one of the identified API calls responsively to the determined API call rankings (or the determined API call ranking scores), and the method ends.

In a manner similar to the description hereinabove, the selected API call has the highest API call ranking score 82 and therefore the highest API call ranking (i.e., of the API calls identified in step 142). In the alternative embodiment, processor 46 can perform step 154 by selecting, from the API calls identified in step 142, the API call having the lowest average latency or the lowest error rate. In this alternative embodiment, processor 46 can compute the API call ranking scores based on one or more performance metrics 86 such as latency and error count.

In embodiments of the present invention, processor 46 typically performs the steps in FIG. 4 after the system processor has computed respective API call ranking scores 82 and API call rankings 84 for API calls 37 and/or after the system processor has computed respective API ranking scores 106 and API rankings 108 for APIs 36. In other words, processor 46 typically performs multiple iterations of steps 118-134 (as described in the description referencing FIG. 3 hereinabove) during a first time period in order to compute respective API ranking scores 82 and API rankings 84 for API calls 37 and to compute respective API ranking scores 106 and API rankings 108 for APIs 36. After computing respective API ranking scores 82 and API rankings 84 for API calls 37 and computing respective API ranking scores 106 and API rankings 108 for APIs 36, processor 46 can perform the steps described in FIG. 4 during a second time period subsequent to the first time period.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:
defining, by a computer, a set of software applications that execute a specific operation on different, respective servers, the software applications having respective application programming interfaces (APIs);
during a first time period:
performing the specific operation multiple times by conveying, from the computer to different ones of the servers, API calls to the APIs, and receiving respective responses to the first API calls;
computing, based at least on the responses, respective performance metrics for the APIs; and
ranking the APIs based on the computed performance metrics; and
at a second time subsequent to the first time period:
receiving, in the computer, a request to execute the specific operation; and
executing the specific operation by automatically selecting, based on the rankings, a given API, and conveying an API call to the selected API.

2. The method according to claim 1, wherein computing respective performance metrics for the APIs comprises computing respective performance metrics for the API calls, and wherein ranking the APIs in the set comprises ranking the API calls based on the computed performance metrics.

3. The method according to claim 1, and comprising receiving, from the selected one or the servers, a response to the conveyed API call to the selected API.

4. The method according to claim 3, wherein the computer comprises a first computer and wherein the instruction to execute the specific operation is received from a second computer, and comprising forwarding, by the first computer to the second computer, the received response to the API call to the selected API.

5. The method according to claim 3, and comprising computing, based at least on the response to the API call to the selected API, updated respective performance metrics for the selected API, and re-ranking the APIs in the set based on the updated computed performance metrics.

6. An apparatus, comprising:
a memory; and
a processor configured:
to define, in the memory, a set of software applications that execute a specific operation on different, respective servers, the software applications having respective application programming interfaces (APIs),
during a first time period:
to perform the specific operation multiple times by conveying, from the computer to different ones of the servers, API calls to the APIs, and receiving respective first responses to the first API calls,
to compute, based at least on the responses, respective performance metrics for the APIs, and
to rank, in the memory, the APIs based on the computed performance metrics; and
at a second time subsequent to the first time period:
to receive a request to execute the specific operation, and
to execute the specific operation by automatically selecting, based on the rankings, a given API, and conveying an API call to the selected API.

7. The apparatus according to claim 6, wherein the processor is configured to compute respective performance metrics for the APIs by computing respective performance metrics for the API calls, and wherein the processor is configured to rank the APIs in the set by ranking the API calls based on the computed performance metrics.

8. The apparatus according to claim 6, wherein the processor is configured to receive, from the selected one or the servers, a response to the conveyed API call to the selected API.

9. The apparatus according to claim 8, wherein the instruction to execute the specific operation is received from a computing device, and wherein the processor is further configured to forward, to the computing device, the received response to the API call to the selected API.

10. The apparatus according to claim 8, wherein the processor is further configured to compute, based at least on the response to the API call to the selected API, updated respective performance metrics for the selected API, and to re-rank the APIs in the set based on the updated computed performance metrics.

11. A computer software product, the product comprising a non-transitory computer-readable medium, in which program instructions are stored, which instructions, when read by a computer, cause the computer:
to define a set of software applications that execute a specific operation on different, respective servers, the software applications having respective application programming interfaces (APIs);
during a first time period:
to perform the specific operation multiple times by conveying, from the computer to different ones of the servers, API calls to the APIs, and receiving respective responses to the first API calls;
to compute, based at least on the responses, respective performance metrics for the APIs; and
to rank the APIs based on the computed performance metrics; and
at a second time subsequent to the first time period:
to receive, in the computer, a request to execute the specific operation; and
to execute the specific operation by automatically selecting, based on the rankings, a given API, and conveying an API call to the selected API.

* * * * *